United States Patent
Araki et al.

(10) Patent No.: US 6,215,596 B1
(45) Date of Patent: Apr. 10, 2001

(54) OPTICAL ELEMENT, OPTICAL DEVICE PROVIDED THEREWITH, AND METHOD FOR EVALUATING OPTICAL ELEMENT

(75) Inventors: Keisuke Araki; Tsunefumi Tanaka, both of Yokohama; Hiroaki Hoshi, Fujisawa, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/394,414

(22) Filed: Sep. 13, 1999

(30) Foreign Application Priority Data

Sep. 14, 1998 (JP) .................................................. 10-279432
Sep. 8, 1999 (JP) .................................................. 11-254068

(51) Int. Cl.[7] .................................................. G02B 27/14
(52) U.S. Cl. .......................... 359/631; 359/630; 359/633; 359/637; 359/720; 359/729; 359/676
(58) Field of Search ...................... 359/630, 631, 359/633, 634, 637, 627, 720, 728, 729, 731, 676

(56) References Cited

U.S. PATENT DOCUMENTS

| 6,021,004 | * | 2/2000 | Sekita et al. ......................... 359/676 |
| 6,097,550 | * | 8/2000 | Kimura ................................ 359/729 |
| 6,104,539 | * | 8/2000 | Togino ................................. 359/637 |
| 6,104,540 | * | 8/2000 | Hayakawa et al. .................. 359/637 |
| 6,124,989 | * | 9/2000 | Oode et al. ......................... 359/729 |

FOREIGN PATENT DOCUMENTS 8-292371  11/1996 (JP) .
9-005650   1/1997 (JP) .

* cited by examiner

Primary Examiner—Loha Ben
(74) Attorney, Agent, or Firm—Fitzpatrick, Cella, Harper & Scinto

(57) ABSTRACT

An optical element integrally has an optically acting surface, which is a rotationally asymmetric, aspherical surface, and a monitor surface for evaluation of whether the optical element is defective or not. The monitor surface is provided in a portion effecting no optical action, except for the optically acting surface.

19 Claims, 6 Drawing Sheets

OPTICAL ELEMENT, OPTICAL DEVICE PROVIDED THEREWITH, AND METHOD FOR EVALUATING OPTICAL ELEMENT

BACKGROUND OF THE INVENTION

1. Field of the Invention

The present invention relates to an optical element and a method for evaluating the optical element. More particularly, the present invention relates to an optical element adapted to form an image of an object by use of an off-axial, optical element block which is molded in an integral form and which includes an optically acting surface of a rotationally asymmetric, aspherical surface or a curved surface (off-axial curved surface) a normal to which does not agree with a reference axis at an intersecting point of an optical path of a reference ray (the reference axis) passing from the object plane to the image plane, and a method for evaluating the optical element.

2. Related Background Art

The conventional optical devices for forming the object image on the final image plane have been constructed mostly using a coaxial type optical system comprised of optical elements having a common optical axis. Since such coaxial optical systems tend to be long along the optical-axis direction, compactification thereof has often been attempted by bending the optical path by a plane mirror.

On the other hand, it has been found out that a non-coaxial optical system as an off-axial, optical system disclosed in Japanese Patent Application Laid-Open No. 8-292371 was able to contribute to the compactification of the optical system.

In the off-axial optical systems, an example of which is illustrated in FIG. 8, the concept of the reference axis (which corresponds to an axis from an axis 5-1 to an axis 5-6 in this figure) is adopted as a correspondent to the optical axis of the coaxial systems.

This is defined as an optical path of a center ray out of those arriving at the center of the object plane or the image plane (the both of which will be totally called the focal plane herein). The optical systems of this type are called off-axial, optical systems, because they include a surface a normal to which does not agree with the reference axis, but makes a finite angle except for 0, at a point where the reference axis corresponding to the optical axis intersects with the component surface. (In FIG. 8 the surfaces r2 to r6 are such surfaces.)

Japanese Patent Application Laid-Open No. 9-5650 describes the details of methods for setting surface shapes and computing paraxial amounts for the non-coaxial, off-axial, optical system, together with properties of the off-axial, optical system.

Generally speaking, it is common practice to use asymmetric, aspherical surfaces for the off-axial, optical systems from the viewpoint of correction for aberration. The optical systems are often designed using off-axial reflecting surfaces in order to construct the optical systems in compact structure or in order to suppress occurrence of chromatic aberration.

In the case of the optical systems employing the off-axial reflecting surfaces, it is favorable in terms of accuracy and cost to mold the whole system in the form of an integral, off-axial, optical element block (either a block of a solid (internally filled) type or a block of a hollow type).

In practical formation (production) of the off-axial, optical element blocks, surface precision can vary, so as to produce defectives, depending upon molding conditions. This raises the need for evaluation to check the finish of shapes of the component surfaces in the optical element block. In this evaluation of the shapes of the component surfaces, since the surface shapes are the rotationally asymmetric, aspherical surfaces, measurement and evaluation cannot be made by interference measurement employed for rotationally symmetric, spherical surfaces. Then, the finish of surface shapes is judged normally by measuring a profile with a contact every line of cross section of the shape and scanning the cross-sectional lines.

This measurement, however, involves problems that a lot of time is necessary for the measurement and evaluation of each of the surface shapes of the optical element and that the contact often damages the optical surface itself on the block.

A challenge for mass production of the off-axial, optical element blocks was thus to establish a determination method capable of determining whether the finish of the off-axial, optical element blocks is good or poor, i.e., capable of discriminating surface conditions within a short time.

In the case of the off-axial, optical element blocks of the solid type, inspection-evaluation also has to be executed as to dust and bubbles inside the optical element, an index profile, birefringence, etc., as well as the surface precision, but there have been no conventionally known determination and evaluation methods thereof.

SUMMARY OF THE INVENTION

In view of the above-stated issues in the conventional technology, an object of the present invention is to provide an optical element and an evaluation method of the optical element permitting easy determination (evaluation) of a defective occurring in a production step.

In order to accomplish the above object, an optical element of a first aspect of the present invention is characterized by integrally comprising:

an optically acting surface which is a rotationally asymmetric, aspherical surface; and a monitor surface for evaluation of whether the optical element is defective or not, said monitor surface being provided in a portion effecting no optical action, except for the optically acting surface.

An optical element of a second aspect of the present invention is characterized by integrally comprising:

an optically acting surface which is a curved surface a normal to which does not agree with a reference axis; and a monitor surface for evaluation of whether the optical element is defective or not, said monitor surface being provided in a portion effecting no optical action, except for the optically acting surface, wherein the reference axis is defined by an optical path of a center ray out of rays arriving at a focal plane through the optical element.

An optical device of a third aspect of the present invention is characterized by having the optical element of the first invention of the present application or the optical element of the second invention of the present application.

A method for evaluating an optical element according to a fourth aspect of the present invention is characterized by comprising the following steps:

a step of integrally molding an optical element having an optically acting surface which is a rotationally asymmetric, aspherical surface, and a monitor surface which is a spherical surface or a plane; and a step of evaluating whether the optical element is defective or not, by making use of the monitor surface.

A method for evaluating an optical element according to a fifth aspect of the present invention is characterized by comprising the following steps:

a step of integrally molding an optical element having an optically acting surface which is a curved surface a normal to which does not agree with a reference axis, and a monitor surface which is a spherical surface or a plane; and a step of evaluating whether the optical element is defective or not, by making use of the monitor surface.

DETAILED DESCRIPTION OF THE PREFERRED EMBODIMENTS

Figure 1A:
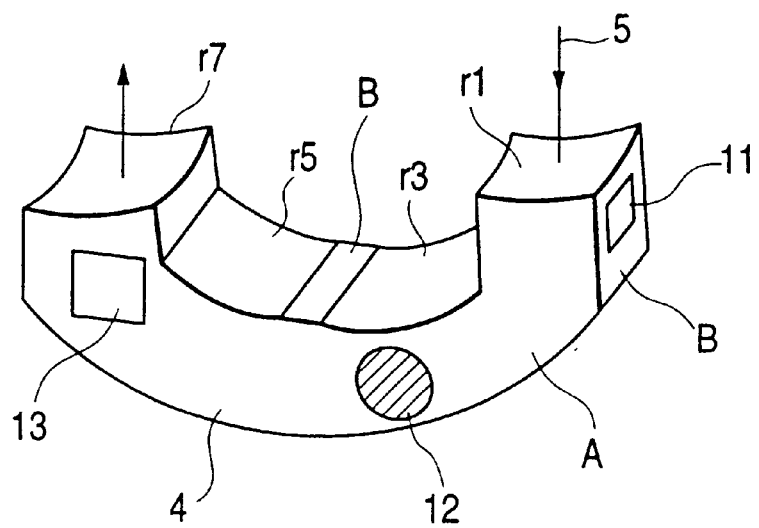
FIG. 1A and FIG. 1B are drawings to show an optical element block of Embodiment 1.
Figure 1B:
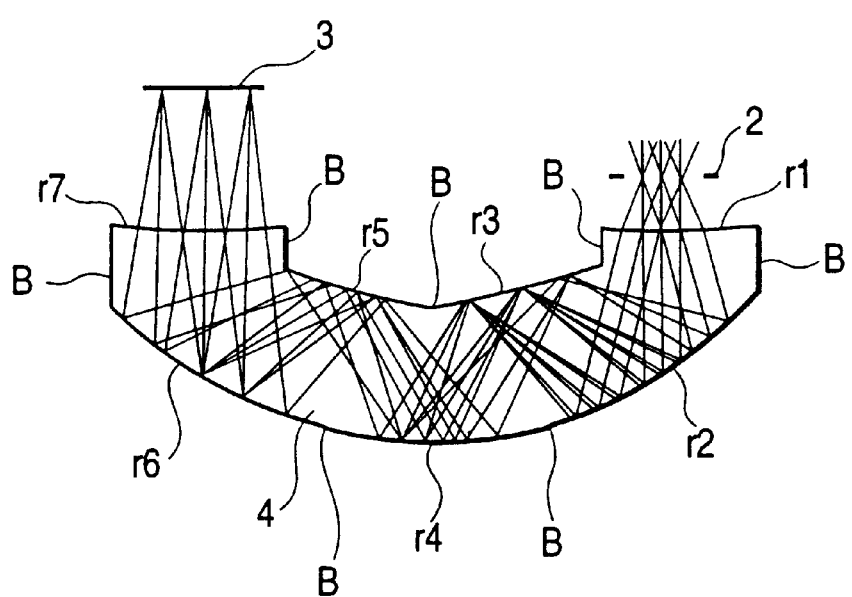

FIGS. 1A and 1B are the schematic diagrams to show the optical element of Embodiment 1 of the present invention. FIG. 1B of these figures is an optical path diagram of an imaging optical system (imaging lens) using an off-axial, optical element block 4, which forms an image of the object plane on the image plane 3, which is an image pickup element such as a CCD sensor or the like. Numeral 2 denotes a stop.

FIG. 1A is a perspective view of the off-axial, optical element block 4. This off-axial, optical element block 4 includes optically acting surfaces (surface r1 to surface r7) which contribute to imaging, and also includes edge surfaces common to the optical surfaces (the edge surfaces being denoted by A in the figures and being two side surfaces of the optical element block 4 in this example) and connecting surfaces to connect the optical surfaces to each other (the connecting surfaces being denoted by B in the figures and being seven surfaces in this example).

The optical element block 4 is provided with a first reflecting surface group of inside reflecting surfaces r2, r4, r6 arranged in the lateral direction on the plane of the drawing through the connecting surface B and a second reflecting surface group of inside reflecting surfaces r3, r5 arranged through the connecting surface B. The edge surfaces (side surfaces) A are parallel to the lateral direction on the plane of the drawing and to the direction in which the first reflecting surface group and the second reflecting surface group are opposed to each other.

The imaging action of the optical element 4 in the present embodiment will be described. Light 5 from an object is regulated in an amount of incident light by the stop 2 and thereafter is incident to the entrance surface r1 of the optical element 4. Then the light is reflected by the surfaces r2, r3. On this occasion the light forms an intermediate image on an intermediate image plane between the surface r2 and the surface r3 and then is successively reflected by the surfaces r4, r5, r6 to emerge from the exit surface r7 and again form an image on the final image plane 3.

In the present embodiment, monitor surfaces of spherical or flat surfaces, as indicated by 11, 12, 13 in the figure, for evaluation of the finish of the surface shapes of the entire optical element or for evaluation of whether the optical element is defective or not, including the dust and bubbles inside the element, the index profile, birefringence, and so on, are formed in surfaces effecting no optical action or not contributing to the imaging, which are represented by the edge surface (side surface) A and the connecting surface B. In this FIG. 1A the monitor surfaces of planes are indicated by squares and the monitor surface of a spherical surface by a circle.

Since the component surfaces (optically acting surfaces) contributing to the imaging of the off-axial, optical system are asymmetric, aspherical surfaces in general, the measurement and evaluation thereof cannot be made by the simple interference measurement employed for the rotationally symmetric, spherical surfaces of the coaxial, optical systems. In contrast with it, since each of the monitor surfaces is a plane or a spherical surface, the measurement and evaluation thereof can be carried out by the simple interference measurement.

It is generally known that in the off-axial, optical element blocks integrally molded in a mold, relative positions of the component surfaces can be defined with better accuracy than those in an assembly of plural lenses in a barrel.

Therefore, the imaging performance is also ensured as long as the surface precision can be maintained at a predetermined level of precision. In that case, no variation in the surface precision will appear normally in the block by optimizing the molding conditions. Therefore, if the surface precision of the monitor surfaces of the spherical or plane surfaces is inspected and checked as an alternative property by the interference measurement, it will substantially assure the surface precision of each optical surface as well.

This means that the work and time necessary for checking the surface precision can be reduced greatly by using the surface precision of the monitor surfaces of the spherical or plane surfaces as an alternative property for checking the surface precision of the off-axial, optical element block during mass production.

Further, inspection and measurement-evaluation items during the mass production of the optical element blocks 4 include the dust and bubbles inside, the index profile inside, the birefringence, etc., as well as the surface precision. Samples off standard ranges of these factors are judged as defectives.

Since the optical element block 4 guides the light by internal reflection, it is completed as an optical element block by depositing a reflective film on the reflecting surfaces and depositing an antireflection film on the entrance and exit surfaces after the integral molding. Therefore, the yield can be increased eventually in such a way that the above inspection and measurement-evaluation are carried out in a stage precedent to the film-forming step immediately after the molding and only non-defective blocks are brought into the film-forming step while defectives are eliminated.

More specifically, in the case of the measurement of the surface precision, shape errors called mean curvature (Newtonian error), astigmatism (curvature error in two orthogonal directions), and deformation (errors except for the two preceding errors) can be specified as main errors of the surface shape from the measurement of the surface precision of the plane monitor surfaces, and, in addition to the foregoing errors, a shrinkage percentage in molding can also be checked from the measurement of the surface precision of the spherical monitor surface. In addition, errors of shift and tilt of each surface can also be checked from relative comparison between them. Namely, the measurement also permits the type and cause of defect to be assumed, as well as the simple judgment of defect. This allows quicker maintenance of the mold and quicker feedback of the result to the molding conditions and molding material, thus presenting the effect of increasing the overall yield.

The above method is the simple measurement different from the measurement of the actual directions and optical paths of the light propagating, but the specification of the type and cause of defect can be facilitated furthermore from comparison of a defective with samples before and after it by monitoring the index profile and birefringence inside.

The dust and bubbles inside are also very useful information for the maintenance of the mold and for management of the molding material and conditions. Since the effect of the dust and bubbles is most significant near the intermediate image plane described above, that area is inspected mainly.

Figure 2:
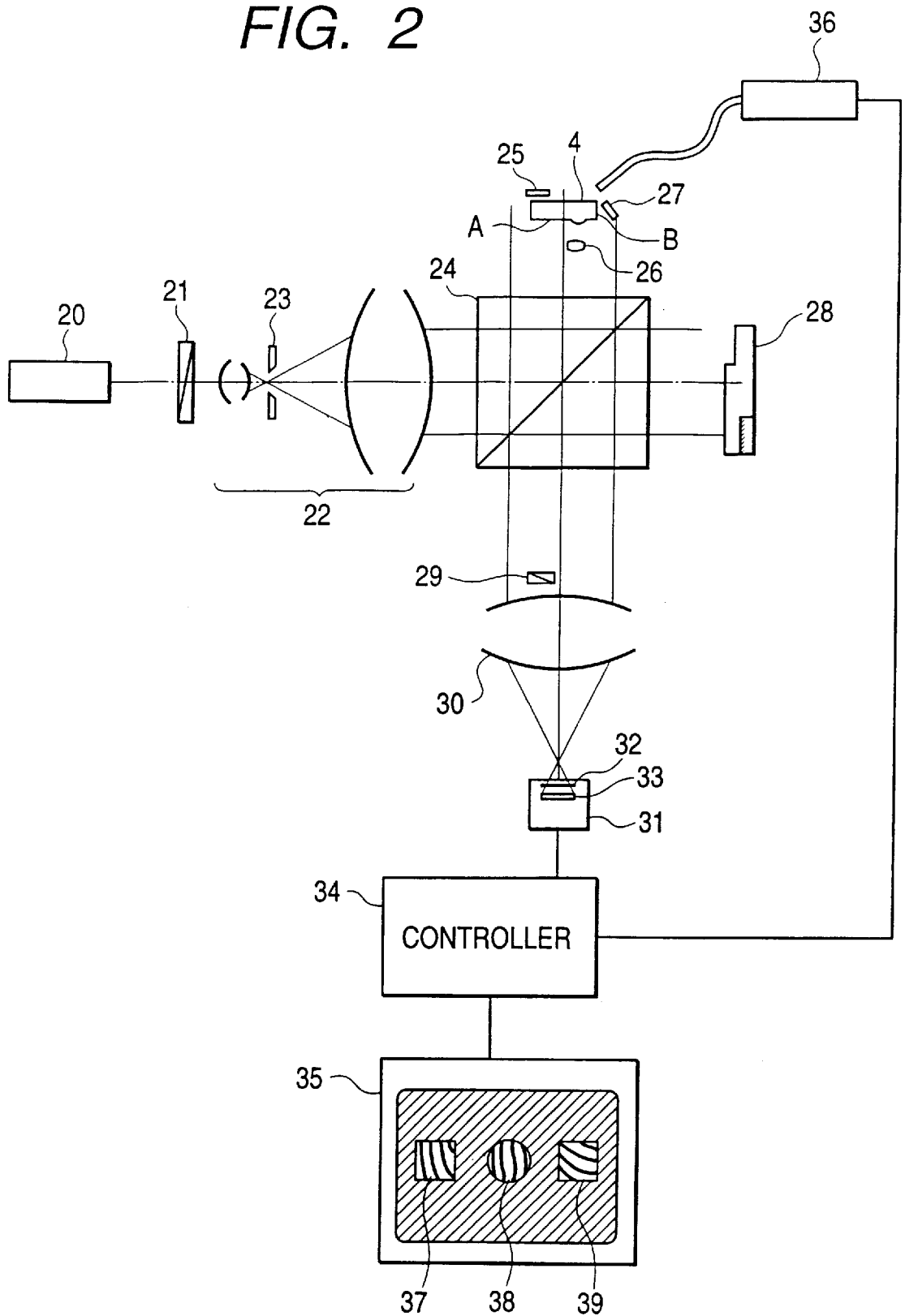
FIG. 2 is a diagram to show an example of a measurement and evaluation apparatus for the optical element block of Embodiment 1.

FIG. 2 shows an example of the measurement evaluation apparatus using a Michelson interferometer.

Figure 4:
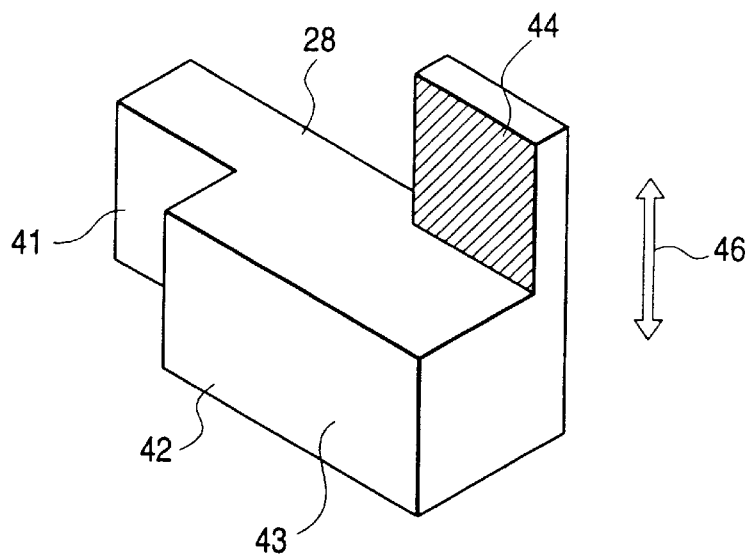
FIG. 4 is a perspective view of a movable reference wavefront block.

Numeral 20 designates a laser or superluminescence diode (SLD) as a light source for the interferometer, 21 a polarizer, 22 a beam expander comprised of an inverted telescope, 23 a pinhole for beam shaping placed at a position of an internal spot of the beam expander, 24 a non-polarizing beam splitter of the wavelength band of the light source 20, 25 a first auxiliary mirror, 26 a movable auxiliary lens, 27 a second auxiliary mirror, 28 a movable reference wavefront block shaped as illustrated in FIG. 4, 29 a movable analyzer, 30 an imaging lens, 31 an interference fringe pickup camera, 32 a shield mask, 33 an image pickup device (CCD), 34 a controller, 35 an image display monitor, and 36 a fiber illuminator for illumination.

Since the optical element block 4 has a lot of surfaces close to each other, there occurs considerable cross-talk between interference fringes and it is thus difficult to specify interfering surfaces and extract only interference fringes occurring therefrom. It is thus desirable to use the SLD with a shorter coherence length rather than the normal laser light sources with a long coherence length, for the measurement of the compact optical element blocks comprised of many surfaces close to each other as in the present embodiment.

Since the optical element block is not through the film-forming step yet, the reflectance of each surface is approximately 5%. The reflectance of each surface of the reference surface block 28 to be made to interfere with the reflected light from the surface of the optical element block is also set to about 5%, so as to satisfy the condition for obtaining interference fringes with high contrast.

Figure 3:
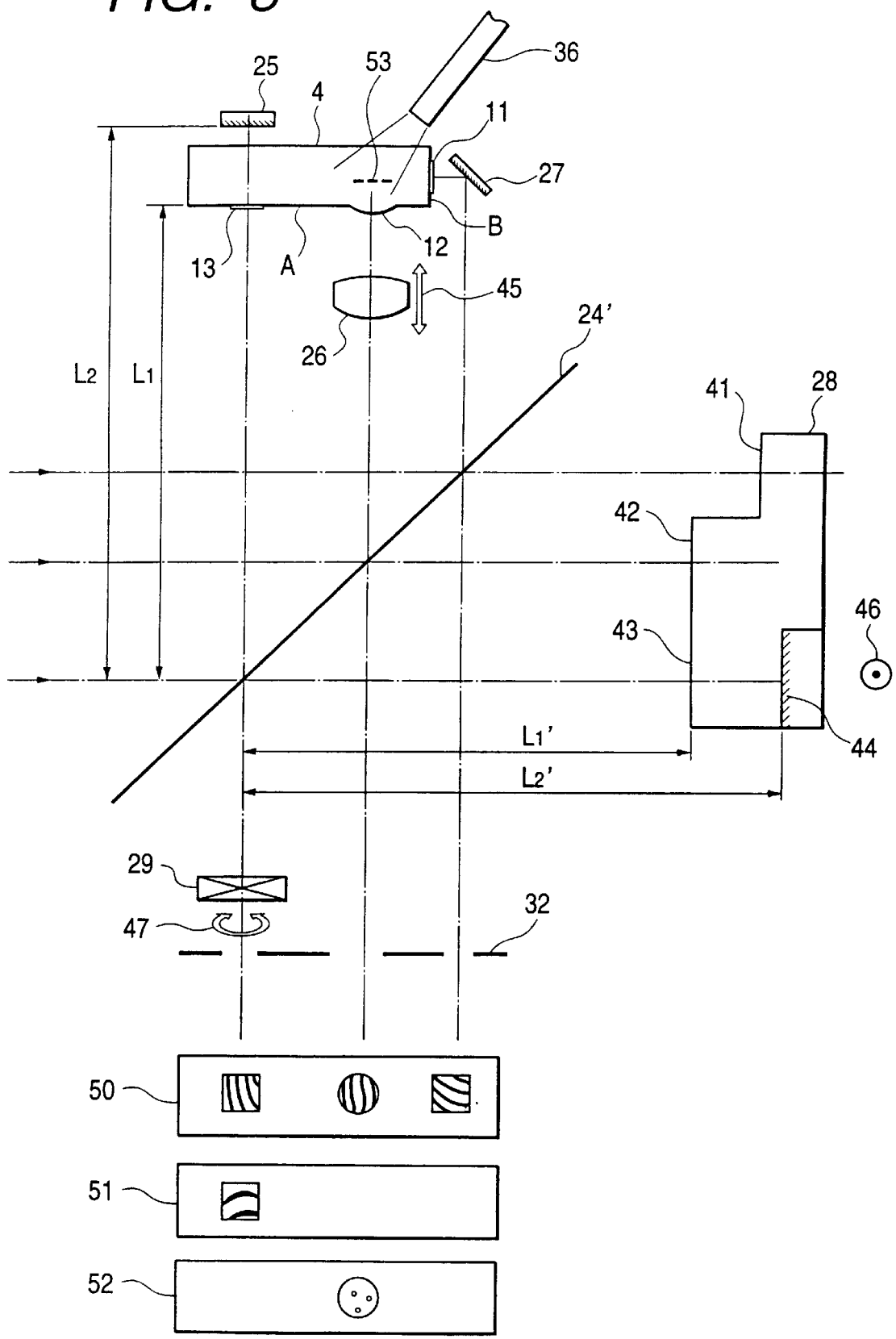
FIG. 3 is a schematic diagram for explaining the action of an interferometer of FIG. 2.

FIG. 3 is the schematic diagram for explaining the action of the interferometer of FIG. 2.

The non-polarizing beam splitter 24 is represented by a splitter surface 24' in order to simplify the description.

Light reflected by the monitor surface 13 as a plane of the optical element block 4 at a distance L1 from the splitter surface 24' comes to overlie light from a reference plane 43 located at a distance L1' to interfere. When the SLD with the short coherence length is used and L1 is approximately equal to L1', equal pathlength interference occurs to produce only interference fringes between the plane 13 and the plane 43 without appearance of interference fringes from the other surfaces, so that more accurate measurement can be made. An azimuth of the polarization axis of the movable analyzer 29 is normal to the plane of the drawing and meets the relation of so-called parallel Nicols wherein interference is made of p-polarized light parallel to the azimuth of polarization of the polarizer 21, whereby the interference fringes can be obtained with a high contrast and a sufficient absolute value of light amount.

For the measurement of the surface precision of the monitor surface 12 which is a convex, spherical surface, the auxiliary lens 26 movable in the directions indicated by 45 is retained at a first position, so that the parallel beam is converted into a converging wavefront to converge at the center of curvature of the monitor surface 12. Thereafter, the converging wave is made incident to the monitor surface 12 and a diverging wavefront reflected thereby is again converted into a parallel wavefront by the auxiliary lens 26 to be made to interfere with the reference wavefront from the reference plane 42.

Further, at the same time as the measurement of the monitor surfaces 12, 13, the measurement of the surface precision of the monitor surface 11 being a plane is also carried out using the second auxiliary mirror 27 fixed at a predetermined position, whereby more accurate measurement and inspection can be made from the relative comparison between the results.

The interference fringes for the measurement and inspection of surface precision thus obtained are as indicated by 50. The shield mask 32 definitely separates the interference fringes corresponding to the respective areas of the monitor surfaces 11, 12, 13 and the controller 34 analyzes the distributions of interference fringes. This quantifies the surface precision of each surface and permits quantitative relative comparison between the surfaces, so as to permit instantaneous determination of whether the block is defective or not.

When the surface shapes are non-defective, the index profile and birefringence are measured next. The movable reference wavefront block 28 is moved in a normal direction to the plane of the drawing (in the direction indicated by 46 in FIGS. 3 and 4), so as to make the reference beam from a corresponding reference surface 44 interfere with a wave transmitted by the monitor surface 13, reflected by the auxiliary mirror 25, and again transmitted by the monitor surface 13. Since the auxiliary mirror 25 and the reference surface 44 are reflecting surfaces made by evaporation of aluminum and both having the reflectance of not less than 90%, the interference fringes are obtained with a high contrast and a sufficient light amount. At this time, in order to achieve the equal pathlength interference, the positions of the auxiliary mirror 25 and the reference surface 44 are determined so that the distances thereof from the splitter surface 24' satisfy the relation of L2–L2'.

The internal index profile of the optical element block 4 is measured under the condition of parallel Nicols of the analyzer 29 to the polarizer 21 as was the case during the measurement of surface precision. The interference fringes obtained in this way are those as indicated by 51, which correspond to a phase difference distribution of go and return through the width between the side surfaces (monitor surface 13) of the optical element block 4. Whether the internal index profile is defective or not is determined by analyzing the interference fringes by the controller 34.

The birefringence is measured at the position of the analyzer 29 in the relation of crossed Nicols by changing the azimuth of the polarization axis of the analyzer 29. If the optical element block 4 has no birefringence only weak light according to an extinction ratio of the polarizer 21 and the analyzer 29 can be transmitted, so that the pattern of 51 will become black. When there exists birefringence, an interference fringe pattern appears in accordance with a birefringence amount corresponding to the go and return through the width of the optical element block 4. Whether the birefringence is in a permissible range is determined by analyzing it by the controller 34, whereby the optical element block 4 is evaluated as to whether it is defective or not in terms of the birefringence.

Next carried out is the measurement and inspection of the dust and bubbles inside the element. In this case, since the interferometer is not used, the measurement can be carried out with higher accuracy by turning the light source 20 off. Instead of the light source, the inside of the monitor surface 12 is illuminated obliquely from the back with illumination light from the fiber illuminator 36. If there exists dust or bubbles they will scatter the light, so that scattered light will appear on the side of the auxiliary lens 26. The auxiliary lens 26 is moved in the directions indicated by 45 relative to the position during the measurement of surface precision, so as to form, in combination with the monitor surface 12 acting as a convex, spherical lens, an image of the vicinity of a predetermined surface 53 corresponding to the intermediate image position inside the optical element block 4, on the CCD 33. Therefore, the scattered light by the bubbles or dust near the surface 53 appears as luminous points on the CCD being a conjugate surface, thus forming a pattern as indicated by 52. By analyzing it by the controller 34, whether the optical element block 4 is defective or not is determined as to the dust and bubbles inside the element.

It is a matter of course that, in cases where there are many dust, bubbles, flaws, etc., the inspection thereof can be carried out prior to the inspection of the surface precision and the internal index profile, which can increase the yield of inspection. In other words, the yield of inspection can be increased by carrying out inspection of a higher defective occurrence percentage with a higher priority than the other inspections.

Although this embodiment was described using the off-axial, optical system having the two refracting surfaces and five reflecting surfaces as an example of the off-axial, optical element block integrally molded in the mold, it should be noted that the spirit and scope of the present invention are not limited to the surface configuration illustrated in the figures, but can also be applied to the general off-axial, optical systems including the other configurations.

The present embodiment was the example in which the monitor surfaces of the spherical or plane surfaces were three surfaces as a combination of the spherical surface with the planes, but the monitor surfaces may also be comprised of only planes or of only spherical surfaces. It is also noted that the number of monitor surfaces does not always have to be plural, or three, but a monitor surface at one position can suffice for molded products with which it was already confirmed that the accuracy of the molded products demonstrated only little variation depending upon positions.

Next described is Embodiment 2 of the present invention. Embodiment 1 employed the prism of the solid type having the entrance and exist surfaces of refracting surfaces and the rest optical surfaces of reflecting surfaces as an example of the off-axial, optical element block integrally molded, but the spirit and scope of the present invention do not limit the off-axial, optical element blocks integrally molded to the solid type prisms composed of reflecting and refracting surfaces. On the contrary the present invention permits the off-axial optical element block integrally molded to be a solid type prism having the optically acting surfaces all composed of refracting surfaces or a hollow type, off-axial, optical element block having the optically acting surfaces all composed of reflecting surfaces.

Figure 5A:
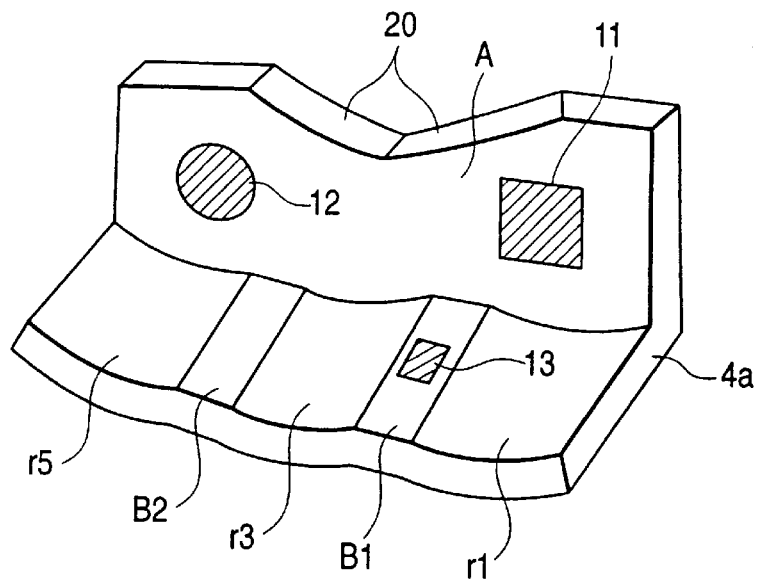
FIG. 5A and FIG. 5B are diagrams to show an optical element block of Embodiment 2.
Figure 5B:
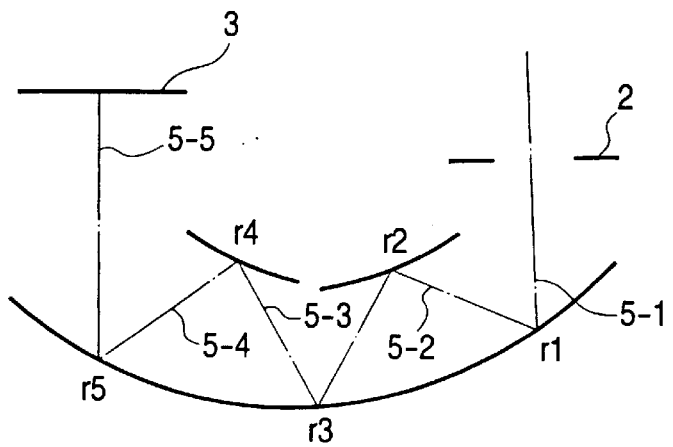

FIGS. 5A and 5B are the schematic diagrams of Embodiment 2 using the hollow type, off-axial, optical element block having the optically acting surfaces all being reflecting surfaces.

FIG. 5B out of the figures is a cross-sectional view of the off-axial imaging optical system, in which an image of the object plane is formed on the image plane 3 by use of the five off-axial reflecting surfaces of r1 to r5. Here axes 5-1, 5-2, 5-3, 5-4, 5-5 constitute the reference axis and numeral 2 designates a stop.

FIG. 5A is a perspective view of the off-axial, optical element block 4a integrally molded so as to connect the surfaces r1, r3, r5. This off-axial, optical element block 4a includes a support surface (indicated by A in the figure) ;common to the three optical surfaces and connecting surfaces (indicated by B1, B2 in the figure) to connect the optical surfaces to each other, in addition to the optical surfaces (r1, r3, r5) contributing to the imaging.

In the present embodiment, the monitor surfaces of spherical or plane surfaces for determination of whether the surface shape of the entire optical element is defective or not, as indicated by 11, 12, 13 in the figure, are formed in the surfaces effecting no optical action or not contributing to the imaging, which are represented by the support surface A and the connecting surfaces B.

In this figure the monitor surfaces of planes are also represented by squares and the monitor surface of a spherical surface by a circle, as in the case of Embodiment 1.

In this optical element there exists another off-axial, optical element block 4b including surfaces r2, r4, but it is omitted from the illustration of the perspective view, because like argument as in the case of the block 4a can be applied.

Numeral 20 in FIG. 5A represents portions to be connected to another off-axial, optical element block 4b.

Figure 6:
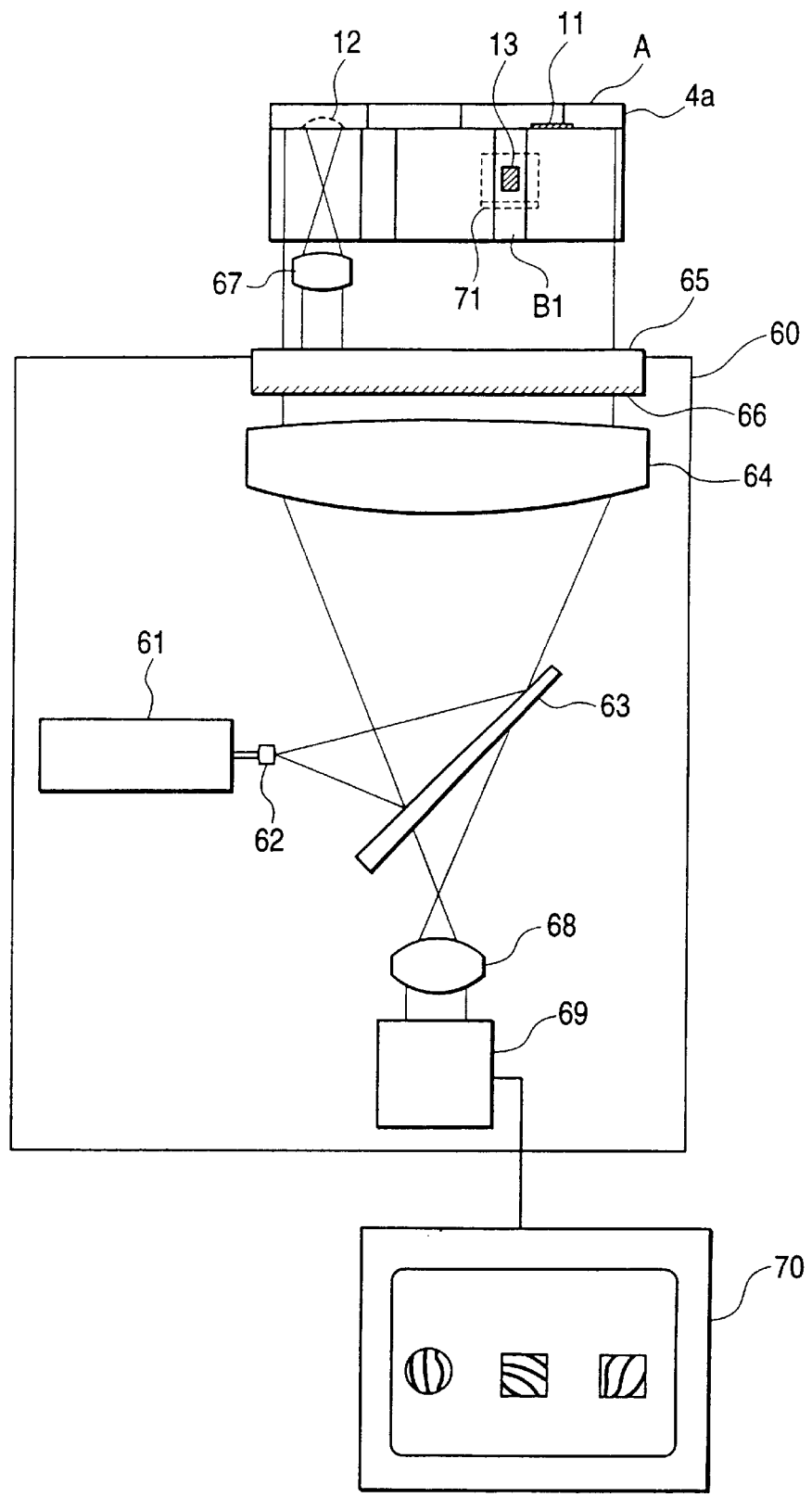
FIG. 6 is a diagram to show an example of a measurement and evaluation apparatus for the optical element block of Embodiment 2.

FIG. 6 is an example of the measurement evaluation apparatus using a Fizeau interferometer for the optical element block 4a illustrated in FIG. 5A.

The hollow type optical element block 4a of the present embodiment does not have to undergo the measurement-evaluation and inspection of the internal index profile, birefringence, dust, bubbles, and flaws, and whether a molded product is defective or not is thus determined only by the inspection of surface precision, different from the optical element block of the solid type as discussed in Embodiment 1.

In FIG. 6, numeral 60 denotes a surface shape measuring device using the Fizeau interferometer, 61 a He—Ne laser as a light source, 62 a beam expander of the inverted telescope type, 63 a half mirror, 65 a reference plane block having a reference plane 66 with the reflectance of 5% and a plane provided with an antireflection film, opposed to the reference plane 66, 67 an auxiliary lens, 71 an auxiliary mirror, 68 an imaging lens, 69 an interference fringe pickup camera, and 70 an image display monitor.

The monitor surfaces of the hollow type optical element block 4a are comprised of the monitor surface 11 of a plane and the monitor surface 12 of a concave, spherical surface within the common support surface A, and the monitor surface 13 of a plane within the connecting surface B1 perpendicular to the support surface, all the monitor surfaces being mirror-finished surfaces. The auxiliary mirror 71 bends part of the parallel beam transmitted by the reference surface 66, perpendicularly into the normal direction to the plane of the drawing, so as to make the beam incident normally to the plane monitor surface 13, and it again bends the reflected parallel light into the direction of the original beam. Since the laser light source 61 has a sufficiently long coherence length, the reference plane does not have to be provided with any step so as to match the optical pathlength with that of each reference wavefront in order to achieve the equal pathlength interference, different from Embodiment 1, and the interference fringes can be obtained with a high contrast, using the common reference plane 66 as it is. For the monitor surface 12, the auxiliary lens 67 converts the parallel beam into a diverging spherical wavefront corresponding to the curvature of the concave, spherical surface 12 and again converts the reflected wavefront thereof into parallel light to be made to interfere with the reference wavefront from the reference plane 66.

The reflectance of each monitor surface of the optical element block 4a before the film-forming step is approximately 5% and the reflected wavefront therefrom overlies the reflected wavefront from the reference plane 66, thereby forming interference fringes with a high contrast on the interference fringe pickup camera 69. The back surface of the common support surface (edge surface A) and the back surface of the connecting surface B1 are rough surfaces, which generate few interference fringes even by use of the laser light source 61 with the long coherence length. Therefore, the interference fringes from the monitor surfaces 11, 12, 13 can be measured accurately. In this way interference fringe patterns appear as indicated in the image display monitor 70 and whether the surface precision is good or not is determined by analyzing them by the controller not illustrated.

The present embodiment employed the off-axial, optical system having the five reflecting surfaces as an example of the off-axial, optical element block in the integrally molded structure of two separate blocks, but it is noted that the spirit and scope of the present invention are not limited to this surface configuration illustrated in the figures, that the number of blocks thus separated is not limited to two, and that the present invention can also be applied to the ordinary, off-axial, optical systems.

The present embodiment was the example in which the monitor surfaces of the spherical or plane surfaces were three surfaces as a combination of the spherical surface with the planes, but the monitor surfaces may also be comprised of only planes or of only spherical surfaces.

It is also noted that the number of monitor surfaces does not always have to be plural, or three, and that only one monitor surface at one place can suffice for molded products with which it was already confirmed that there was little variation depending upon positions as to the accuracy of the molded products.

Figure 7:
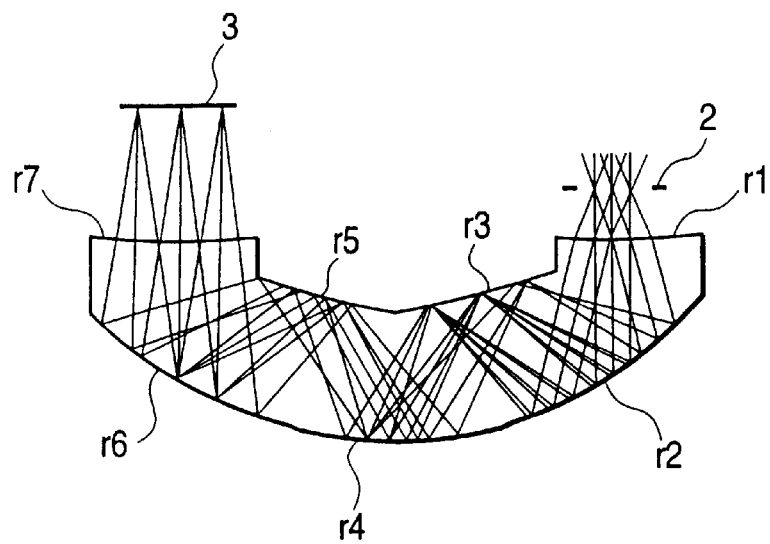
FIG. 7 is a diagram to show an optical element block of Embodiment 3.
Figure 8:
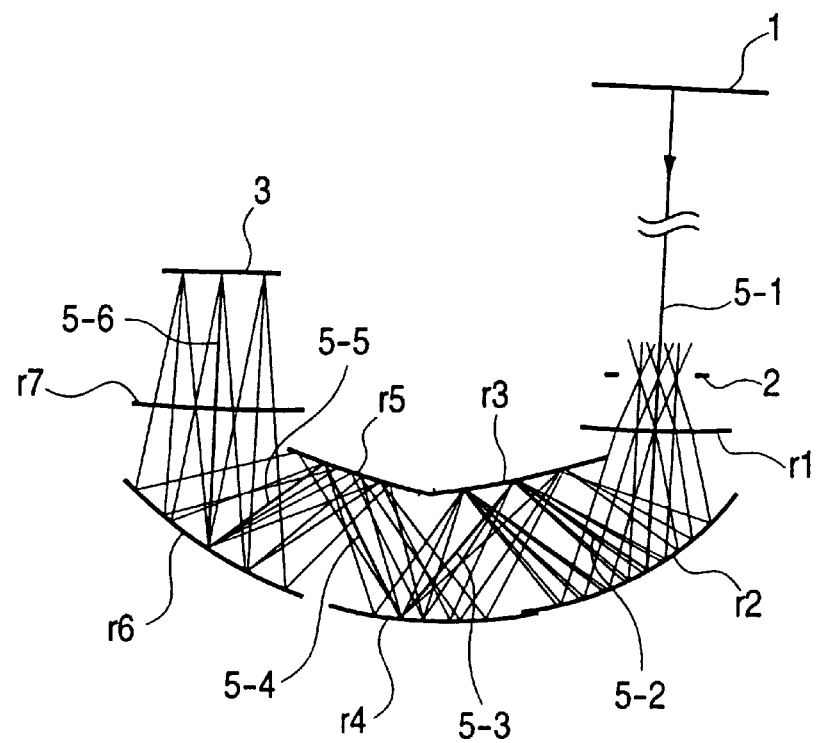
FIG. 8 is an explanatory diagram of an off-axial, optical system.

Embodiment 3 of the present invention is next shown in FIG. 7. The structure of this embodiment is similar to the optical path diagram of Embodiment 1, but the monitor surfaces are provided in optical surfaces contributing to the imaging.

In this figure, r3 is constructed as a plane and r7 as a spherical surface out of the optical surfaces r1 to r7 contributing to the imaging.

In general the component surfaces contributing to the imaging in the off-axial, optical systems are asymmetric, aspherical surfaces. However, an optical system composed of many component surfaces or an optical system requiring not so high resolution, can also be designed so as to have some of component surfaces of plane or spherical surfaces and compensate for asymmetric aberrations such as axial astigmatism and axial coma by the other component surfaces.

In such cases, it is conceivable to employ a method of judging the finish of the shapes of all the component surfaces including the asymmetric, aspherical surfaces by monitoring the surfaces comprised of the plane or spherical surfaces. Since such monitor surfaces are comprised of the plane or spherical surfaces, they can be measured and evaluated by the simple interference measurement.

Although the present embodiment was described with the configuration in which the reflecting surface r3 was the plane and the refracting surface r7 was the spherical surface, it is needless to mention that the present invention embraces an example using a spherical surface as a monitor surface of a reflecting surface and a plane as a monitor surface of a refracting surface.

The present embodiment was provided with the totally two surfaces of the spherical surface and plane as the monitor surfaces of the spherical or plane surfaces, but the monitor surfaces may also be comprised of only planes or of only spherical surfaces.

It is also noted that the number of monitor surfaces does not always have to be plural, or two, but only one monitor surface at one position can suffice for molded products with which it was already confirmed that there was little variation depending upon positions as to the accuracy of the molded products.

As described above, the finish quality of the overall optical element is judged by forming the monitor surfaces of the spherical or plane surfaces for judging the finish condition of the surface configuration of the overall optical element, in the side portion and the connecting surface portion not contributing to the imaging of the off-axial, optical element integrally molded, and checking the finish of the monitor surfaces; this presents the effect of capability of greatly decreasing the work and time necessary for the check during mass production.

When at least one of the refracting surfaces or the reflecting surfaces forming the off-axial, optical element integrally molded is used as a monitor surface formed as a spherical surface or as a plane and when the finish quality of the overall optical element is judged by checking the finish state of the monitor surface, the invention provides the effect of capability of greatly decreasing the work and time necessary for the check during mass productions without formation of any other monitor surface.

What is claimed is:

1. An optical element integrally comprising:
   an optically acting surface which is a rotationally asymmetric, aspherical surface; and
   a monitor surface for evaluation of whether the optical element is defective or not, said monitor surface being provided in a portion effecting no optical action, except for the optically acting surface.

2. The optical element according to claim 1, which integrally comprises:

two refracting surfaces; and a plurality of reflecting surfaces;

wherein light incident to one refracting surface out of said two refracting surfaces is guided to the other refracting surface while successively being reflected by said plurality of reflecting surfaces, and at least one of said two refracting surfaces and said plurality of reflecting surfaces is said optically acting surface.

3. The optical element according to claim 1, which integrally comprises:

two refracting surfaces;

a first reflecting surface group in which a plurality of inside reflecting surfaces are arranged through a connecting surface in a predetermined direction;

a second reflecting surface group opposed to the first reflecting surface group and having at least one inside reflecting surface; and a side surface parallel to a direction in which said first reflecting surface group and second reflecting surface group are opposed to each other;

wherein light incident to one refracting surface out of said two refracting surfaces is guided to the other refracting surface while being reflected alternately by the inside reflecting surfaces of said first reflecting surface group and by the inside reflecting surface of said second reflecting surface group;

wherein said monitor surface is provided in said connecting surface or in said side surface; and wherein at least one of said two refracting surfaces, the inside reflecting surfaces of said first reflecting surface group, and the inside reflecting surface of said second reflecting surface group is said optically acting surface.

4. The optical element according to claim 1, which integrally comprises:

a plurality of reflecting surfaces;

wherein at least one of said plurality of reflecting surfaces is said optically acting surface.

5. The optical element according to claim 1, which integrally comprises:

a reflecting surface group in which a plurality of reflecting surfaces are arranged through a connecting surface in a predetermined direction; and a side surface parallel to said predetermined direction;

wherein said monitor surface is provided in said connecting surface or in said side surface, and wherein at least one of the reflecting surfaces of said reflecting surface group is said optically acting surface.

6. The optical element according to claim 1, wherein said monitor surface is a plane or a spherical surface.

7. An optical element integrally comprising:

an optically acting surface which is a curved surface a normal to which does not agree with a reference axis; and a monitor surface for evaluation of whether the optical element is defective or not, said monitor surface being provided in a portion effecting no optical action, except for the optically acting surface;

wherein said reference axis is defined by an optical path of a center ray out of rays arriving at a center of a focal plane through the optical element.

8. The optical element according to claim 7, which integrally comprises:

two refracting surfaces; and a plurality of reflecting surfaces;

wherein light incident to one refracting surface out of said two refracting surfaces is guided to the other refracting surface while successively being reflected by said plurality of reflecting surfaces, and at least one of said two refracting surfaces and said plurality of reflecting surfaces is said optically acting surface.

9. The optical element according to claim 7, which integrally comprises:

two refracting surfaces;

a first reflecting surface group in which a plurality of inside reflecting surfaces are arranged through a connecting surface in a predetermined direction;

a second reflecting surface group opposed to the first reflecting surface group and having at least one inside reflecting surface; and a side surface parallel to a direction in which said first reflecting surface group and second reflecting surface group are opposed to each other;

wherein light incident to one refracting surface out of said two refracting surfaces is guided to the other refracting surface while being reflected alternately by the inside reflecting surfaces of said first reflecting surface group and by the inside reflecting surface of said second reflecting surface group;

wherein said monitor surface is provided in said connecting surface or in said side surface; and wherein at least one of said two refracting surfaces, the inside reflecting surfaces of said first reflecting surface group, and the inside reflecting surface of said second reflecting surface group is said optically acting surface.

10. The optical element according to claim 7, which integrally comprises:

a plurality of reflecting surfaces;

wherein at least one of said plurality of reflecting surfaces is said optically acting surface.

11. The optical element according to claim 7, which integrally comprises:

a reflecting surface group in which a plurality of reflecting surfaces are arranged through a connecting surface in a predetermined direction; and a side surface parallel to said predetermined direction;

wherein said monitor surface is provided in said connecting surface or in said side surface, and wherein at least one of the reflecting surfaces of said reflecting surface group is said optically acting surface.

12. The optical element according to claim 7, wherein said monitor surface is a plane or a spherical surface.

13. An optical device comprising the optical element as set forth in either one of claims 1 to 12.

14. A method for evaluating an optical element, said method comprising:

a step of integrally molding an optical element having an optically acting surface which is a rotationally asymmetric, aspherical surface, and a monitor surface which is a spherical surface or a plane; and a step of evaluating whether the optical element is defective or not, by making use of said monitor surface.

15. The method according to claim 14, wherein said monitor surface is provided in a portion effecting no optical action, except for said optically acting surface.

16. The method according to claim 14, wherein said optical element has a plurality of optically acting surfaces, and wherein at least one of said plurality of optically acting surfaces is said optically acting surface of the rotationally asymmetric, aspherical surface and at least one of said plurality of optically acting surfaces is said monitor surface.

17. A method for evaluating an optical element, said method comprising:

a step of integrally molding an optical element having an optically acting surface which is a curved surface a normal to which does not agree with a reference axis, and a monitor surface which is a spherical surface or a plane; and a step of evaluating whether the optical element is defective or not, by making use of said monitor surface.

18. The method according to claim 17, wherein said monitor surface is provided in a portion effecting no optical action, except for said optically acting surface .

19. The method according to claim 17, wherein said optical element has a plurality of optically acting surfaces, and wherein at least one of said plurality of optically acting surfaces is said optically acting surface of the rotationally asymmetric, aspherical surface and at least one of said plurality of optically acting surfaces is said monitor surface.

* * * * *

UNITED STATES PATENT AND TRADEMARK OFFICE
CERTIFICATE OF CORRECTION

PATENT NO. : 6,215,596 B1
DATED : April 10, 2001
INVENTOR(S) : Keisuke Araki et al.

It is certified that error appears in the above-identified patent and that said Letters Patent is hereby corrected as shown below:

<u>Column 8,</u>
Line 1, "exist" should read -- exit --; and
Line 27, ";common" should read -- common --.

<u>Column 10,</u>
Line 27, "totally" should read -- total --.

Signed and Sealed this

Twenty-sixth Day of February, 2002

Attest:

JAMES E. ROGAN
*Attesting Officer*     *Director of the United States Patent and Trademark Office*